Patented Jan. 8, 1952

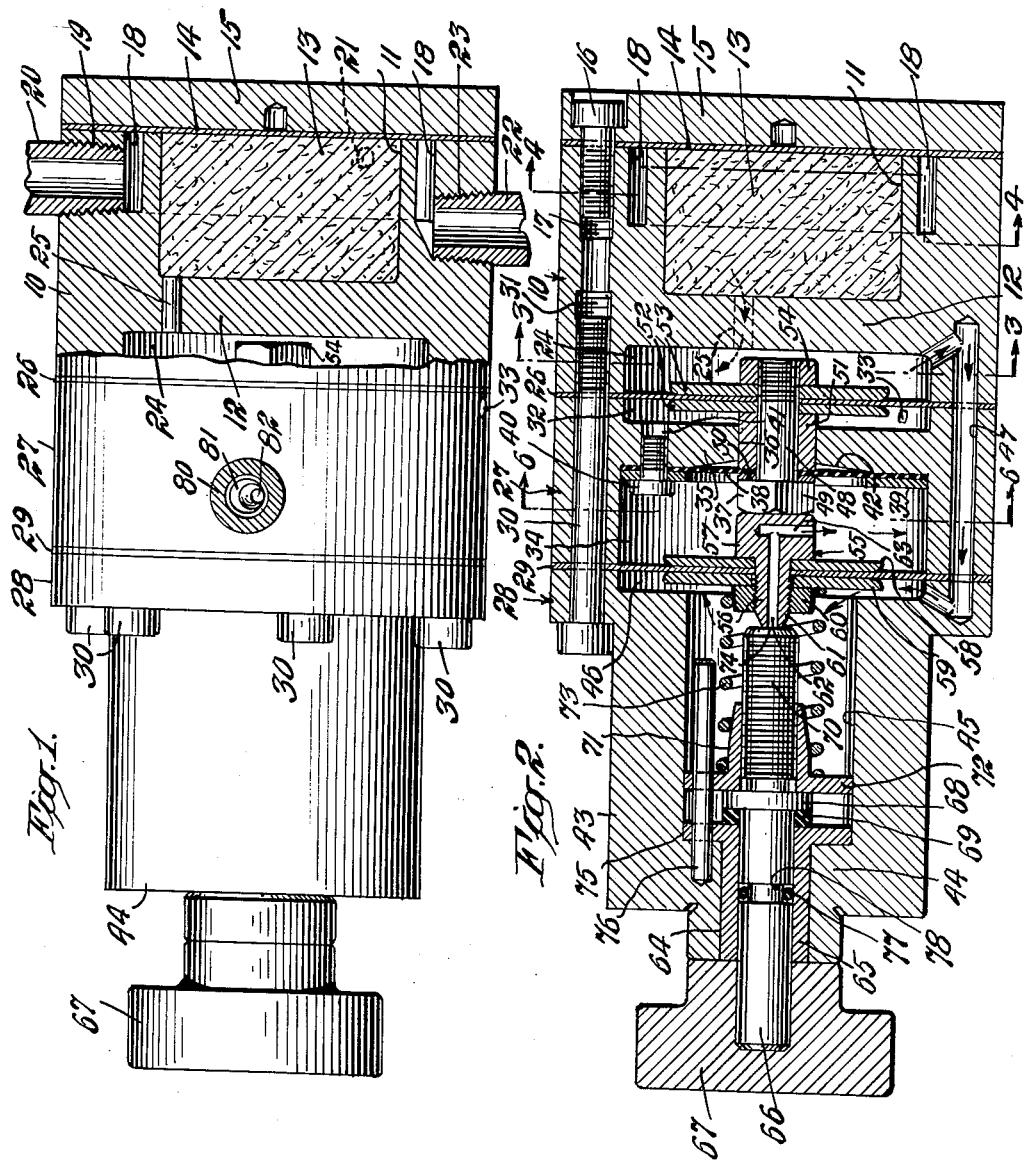

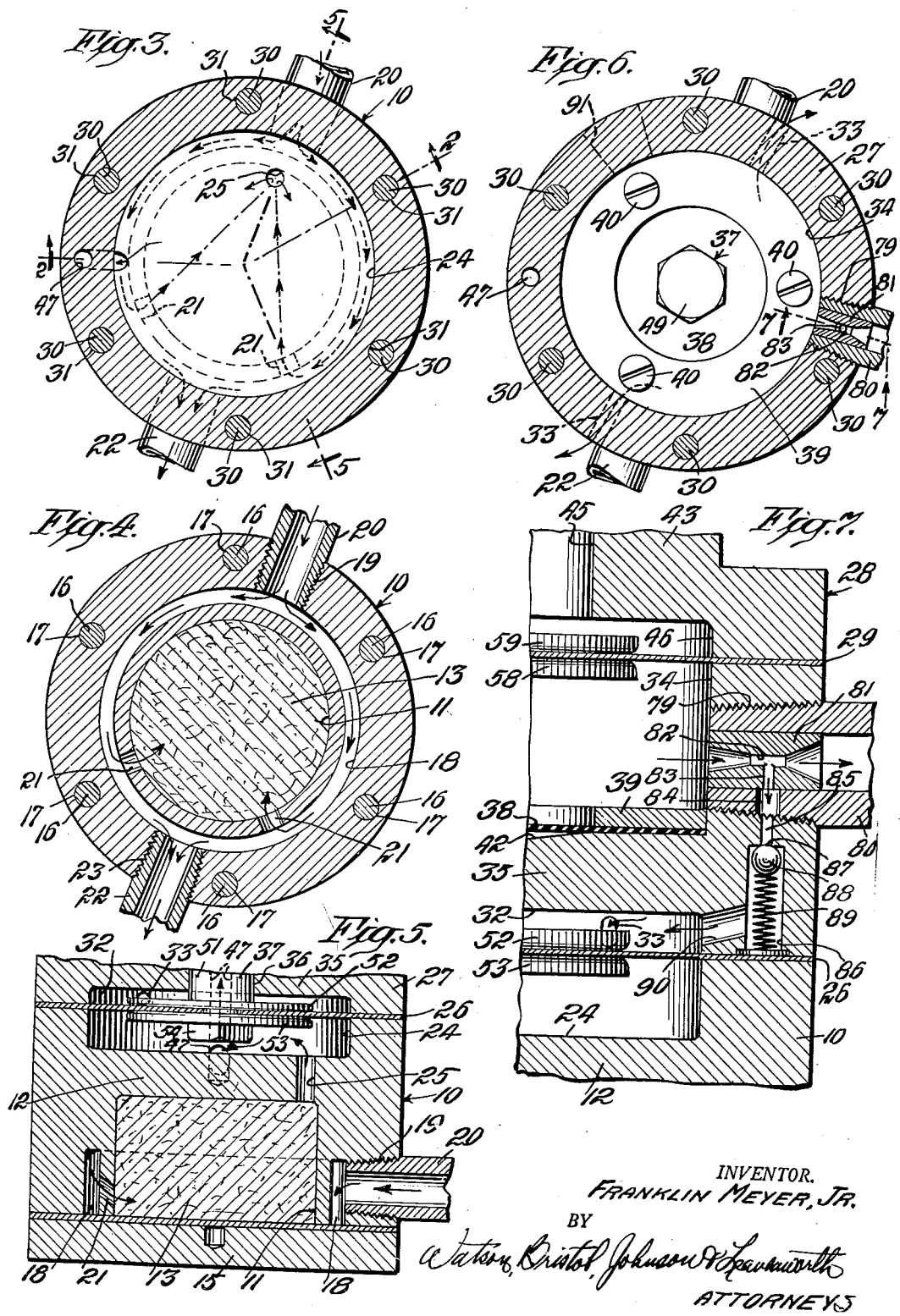

2,581,429

UNITED STATES PATENT OFFICE 2,581,429

FLUID PRESSURE REGULATOR AND VALVE STRUCTURE THEREOF

Franklin Meyer, Jr., Philadelphia, Pa.

Application March 3, 1948, Serial No. 12,857

5 Claims. (Cl. 50—13)

1

The present invention relates to fluid pressure regulators, more particularly of the type adapted to maintain a fluid supply for a fluid demanding device at a substantially constant pressure with variations in fluid demand, and which, by way of example, may be used to advantage in an apparatus of the type described in the copending application of the applicant and Clifford Stead titled Measuring Apparatus for Gage Determination of Dimensions of Bodies with Flow of Fluid under Pressure from an Orifice, Serial No. 892, filed January 7, 1948, now Patent No. 2,513,374, July 4, 1950.

A general object of the present invention is to provide such pressure regulator apparatus and valve parts thereof which are of simple and economical construction and easily reproduced in commercial quantities, which makes possible the elimination of auxiliary valve springs, and which is unusually efficient in automatically maintaining substantially constant the pressure of fluid supplied by it to a fluid demanding device characterized by variations in demand which cause a varying rate of flow of the supplied fluid, even though there be fluctuations in the pressure of the fluid being supplied to the apparatus of the invention.

A more specific object of the invention is the provision of such a pressure regulator in which diaphragm means for conditioning flow control valve means is employed in a manner to have pressure of fluid supplied to the regulator balance out on opposite sides of the diaphragm means.

Another object of the present invention is to provide in such a diaphragm-equipped regulator means to apply pressure of delivered fluid to the movable element of the control valve means in opposition to biasing force of valve spring means for effective balance thereof.

A further object of the invention is to provide and preferably equip the regulator with venting means which will automatically bleed off excess of fluid being delivered as flow rate thereof is decreased below a predetermined minimum by diminished demand to assure a most efficient balance of forces in the regulator.

An additional object is to provide certain unique valve structure which is of simple construction, positive and sure in action and easily adjusted with precision.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a side elevation of an embodiment of the pressure regulator apparatus of the present invention, with parts broken away and in section, showing the preferred position of the device when mounted for use;

Fig. 2 is a longitudinal section of the embodiment of the apparatus shown in Fig. 1, taken substantially on line 2—2 of Fig. 3;

Fig. 3 is a transverse sectional view taken substantially on line 3—3 of Fig. 2, and with parts broken away;

Fig. 4 is a transverse sectional view taken substantially on line 4—4 of Fig. 2, and with parts broken away;

Fig. 5 is a longitudinal sectional view, to an enlarged scale, with parts broken away, taken substantially on line 5—5 of Fig. 3;

Fig. 6 is a transverse sectional view, with parts broken away, taken substantially on line 6—6 of Fig. 2; and Fig. 7 is an enlarged longitudinal section, with parts broken away, taken substantially on line 7—7 of Fig. 6.

Referring to the drawings, like numerals indicate similar parts throughout, and, as will be seen therefrom, the preferred embodiment of the fluid pressure regulator of the present invention preferably comprises a cylindrical casing section 10 having an axially-extending recess 11 therein closed off at one end by an integral partition 12 and in which is disposed a body 13 of any suitable absorbent filtering material. The resultant filtering chamber provided by recess 11 is closed off by a gasket 14 and end plate 15, with the latter mounted to casing section 10 preferably by means of a plurality of stud bolts 16—16 threadedly received in internally threaded holes 17—17, as best seen in Figs. 2 and 4.

There is also formed in casing section 10 an annular recess 18 arranged circumambiently of the filtering chamber recess 11, which is also closed off by gasket 14 and plate 15. An internally threaded tapered hole 19 threadedly receives the externally threaded end of a fluid supply tube 20 preferably to feed gaseous fluid, such as compressed air, from any suitable source to a collector chamber of the regulator provided by recess 18. As will best be seen from Fig. 4, the in-flowing fluid or compressed air will flow about on both sides of the collector chamber 18 to communicating holes 21, 21, and thence into the filtering chamber 11. Excess liquid such as moisture or oil in the in-flowing gaseous fluid or compressed air will be drained out by tube 22 having an externally threaded end thereof threadedly engaged in an internally threaded tapered hole 23, as will be more fully explained hereinafter.

The casing section 10 is also provided on the far side of partition 12 with another sealed axially-arranged recess 24 to provide a supply pressure chamber. Communication between the filtering chamber 11 and supply pressure chamber 24 is provided by means of a hole 25 through partition 12. The supply pressure chamber 24 has one wall thereof provided or is closed off by a diaphragm 26 of usual or known construction, held in position by means of a second casing section 27, and such diaphragm may be formed of resilient metallic material but is preferably formed of a hard rubber compound known as "neoprene," or equivalent material.

A third casing section 28 is provided with a second diaphragm 29 of material similar to that from which diaphragm 26 is formed, interposed between that casing section and casing section 27. For ease and simplicity in assembly of parts, first casing section 10, diaphragm 26, second casing section 27, diaphragm 29, and third casing section 28 are all stacked together in that order, as shown in Fig. 2, and stud bolts 30—30 are extended through aligned holes in the second and third casing sections and in the two diaphragms to be threadedly engaged in internally threaded holes 31—31 in the first casing section.

The second casing section 27 also has an axially-extending, cylindrical recess 32 therein on the far side of diaphragm 26, which is vented to atmosphere by means of two holes 33, 33 for a dual purpose hereinafter more fully explained, one of which is to assure that the back of the supply chamber diaphragm 26 is not submitted to elevated pressures. The second casing section 27 is also provided with a second cylindrical, axially-extending recess 34 with an integral partition 35 intervening between it and recess 32. An axial hole 36 in partition 35 slidably receives therethrough a stem structure 37, hereinafter more fully described. Since it is intended that recess 34 serve as a delivery chamber and it is desired to isolate the back of diaphragm 26 from elevated pressures in the apparatus, a sealing rubber diaphragm 38 is secured to stem 37 and faces partition 35 of casing section 27. A ring 39 and stud screws 40—40 threadably mounted in internally threaded holes 41—41 in partition 35 suitably anchor the circumferential edge of sealing diaphragm 38. Since it is intended that stem 37 be permitted longitudinal sliding motion in hole 36 the face of partition 35 is annularly relieved or cut away at 42 to give freedom of action to the central portion of sealing diaphragm 38.

The casing section 28 is provided with an extension 43 having an end wall 44 and a cylindrical, axially-extending recess 45. The face of casing section 28 is also provided with a cylindrical, axially-extending recess 46 which cooperates with recess 45 to constitute a pressure balancing chamber. One wall of pressure balancing chamber 45, 46 is defined by a face of diaphragm 29 with one wall of delivery chamber 34 defined by the opposite face of that diaphragm. Communication is provided between supply pressure chamber 24 and pressure balancing chamber 45, 46 by means of a passage 47 formed by suitably drilling casing sections 10, 27 and 28, and diaphragms 26 and 29, as is most clearly indicated in Fig. 2.

The diaphragms 26 and 29 are of a well-known type provided with central stiffening means to confine the effective areas to an annular portion. For example, diaphragm 26 is centrally apertured to receive the shank of a bolt 48 having a head 49 adjacent which is mounted a washer 50, between which and one end of sleeve 51 an annular central portion of sealing diaphragm 38 is clamped. The other end of sleeve 51 abuts against a diaphragm stiffening plate 52, which rests against the rear face of diaphragm 26. A second stiffening plate 53 is positioned against the front face of diaphragm 26, and a nut 54 is threadedly engaged on the threaded end of the shank of bolt 48 beyond the latter stiffening plate to hold the parts of stem assembly 37 rigidly together with the parts arranged in the order shown in Fig. 2. Supply chamber diaphragm 26 is thus provided with a stem assembly 37 which slidably projects through hole 36 in partition 35 into delivery chamber 34.

The second diaphragm 29 is provided with stem means 55 preferably comprising an externally threaded member 56 extending through a central hole in that diaphragm, and having a head 57 located in delivery chamber 34. A stiffening plate 58 is interposed between head 57 and diaphragm 29, and a second stiffening plate 59 is located on the far side of the latter, with an internally threaded tapered nut 60 engaging the externally threaded member 56 to hold the parts together as indicated in Fig. 2, and with that structure providing stem means 55 extending through diaphragm 29 to opposite sides thereof. End 61 of externally threaded member 56, which is located in pressure balancing chamber portion 45, 46, is preferably tapered as shown, and drill holes 62 and 63 cooperate to provide a passage through stem means 55, so that the latter may serve as a valve nozzle and constitute a movable valve element. It will be seen that the passage formed by drill holes 62 and 63 provides communication between pressure balancing chamber 45, 46 and delivery chamber 34.

An axial hole 64 in end partition wall 44 of casing section extension 43 receives a bearing sleeve 65 which rotatably supports a control shaft 66 externally carrying a manual control knob 67 for rotating it. Internally of the recess 45, control shaft 66 has a collar or annular flange 68 between which and the inner end of bearing sleeve 65 is interposed a fiber thrust washer or ring 69. The inner end 70 of control shaft 66 beyond the collar 68 is externally threaded, as shown in Fig. 1, threadably to receive thereon an internally threaded sleeve or annulus 71 having an annular flange 72 against which one end of a helical spring 73 abuts. The other end of helical spring 73 is telescoped over tapered nut 60 and abuts stiffening plate 59, as shown in Fig. 2, to bias the valve nozzle 61 and the diaphragm 29, with the latter adapted to be closed off with proper balance of forces or with no compression of the biasing spring by the face 74 of the extreme inner end of control shaft 66. The latter thus constitutes a relatively fixed valve element for cooperation with the movable valve element provided in the form of valve nozzle 61.

Aligned holes in flange 72 of threaded sleeve 71, end flange 75 of bearing sleeve 65 and partitioning end wall 44, receive a pin 76 to prevent relative rotation of parts. It will thus be seen that rotation of control shaft 66 by control knob 67 will screw, advance or retard internally threaded sleeve 71 along the externally threaded end 70 of the shaft to increase or decrease compression of biasing spring 73, depending upon which direction in which the control knob is rotated. A gasketing ring 77 of "neoprene" or similar material is seated in a groove 78 in shaft 66 to serve as a seal for chamber 45—46.

An outlet or delivery passage is provided for delivery chamber 34 by means of an internally threaded tapered hole 79 in the external wall of casing section 27, which threadably receives the externally threaded end of a delivery tube 80, as is best shown in Figs. 6 and 7. The delivery tube 80 is adapted for connection to any fluid demanding device, such as the gauge apparatus of the above identified joint application of Clifford Stead and myself, which, it will be understood due to the nature of the operation thereof, will continuously demand gaseous fluid or compressed air but with frequent variation in the amount of demand and attendant rate of flow thereof. In accordance with one phase of the present invention, it has been found that continued balance of forces in the present regulator apparatus under such conditions is most effectively attained when provision is made for automatic bleed off or venting of that portion of delivery fluid which is in excess of the demands of the device being supplied. For this purpose, a venting passage is provided which communicates with the delivery passage or connects the latter to atmosphere, and an automatic valve is mounted in that venting passage so as to permit bleed off of excess delivered fluid as flow rate through the delivery passage is decreased below a predetermined minimum by diminishing demand.

Preferably, that venting means comprises a Venturi constriction provided by a Venturi sleeve 81 which has a constricted section 82 connected by a bore 83 to a hole 84 in delivery tube 80 which communicates with a passage 85 in the middle casing section 27. The passage 85 is counterbored at 86 to provide a valve seat at 87 for cooperation with a valve ball 88 and a chamber for valve biasing spring 89. A bore 90, also in casing section 27, communicates valve chamber 86 with recess 32 which is vented to atmosphere by holes 33, 33. The venting valve biasing spring 89 has a predetermined biasing force rating, as is more fully explained hereinafter in connection with a description of the operation of the embodiment shown in the drawings.

In operation of the device shown by way of example in the drawings (which, incidentally, may be employed to control or regulate the pressure of any compressible fluid), a source of compressed air (the pressure of which may fluctuate) is connected by supply tube 20 to the regulator apparatus. The latter preferably will be positioned or mounted with its axis arranged substantially horizontal and with supply tube 20 uppermost as viewed in Fig. 1. The compressed supply air enters the regulator through the port 19 flowing to annular collector chamber 18. The compressed air will flow around both sides of collector chamber 18, as indicated in Fig. 4, to the ports 21, 21, and via the latter into filtering chamber 11. Excess moisture in the compressed supply air will drop to the bottom of collector chamber 18, there to be drained through port 23 and drain tube 22, which may be valved by any suitable valve structure. The compressed supply air which flows through ports 21, 21 will pass into and through the body 13 of absorbent filtering material in filtering chamber 11, so that any moisture or oil which may still be suspended in the flowing supply air, will be absorbed or screened out by the filtering material.

The filtered supply air then passes through passage 25 into supply pressure chamber 24 to exert flexing pressure on diaphragm 26, which carries push stem assembly 37. From supply pressure chamber 24, the supply air passes through passage 47 into pressure balancing chamber 45, 46 to apply pressure to the second pressure diaphragm 29. Proper dimensioning of the various passages mentioned will assure maintenance of the same pressure in pressure balancing chamber 45, 46 as is in supply pressure chamber 24. With such balance of pressure, the valve nozzle 61, which is connected to or mounted on the second pressure diaphragm 29, is subjected to equal and opposing pressures by means of diaphragm 29 and diaphragm 26 through stem assembly 37 and stem means 55, with the head 57 of the latter abutted against stem head 49. Consequently, the existing balance of forces assures that there will be no motion of the valve nozzle 61 and the dual diaphragm assembly, and it will be seen that the two diaphragms 26 and 29 operate together to serve as an unitary diaphragm means, with supply pressure being applied to opposite sides thereof in supply chamber 24 and pressure balancing chamber 45, 46. The various parts of the apparatus will thus be positioned relative to each other as shown in Fig. 1, assuming that valve biasing spring 73 is relaxed or in its fully expanded position so that it is not exerting any biasing force on diaphragm 29.

In order to permit flow of compressed air through the valve nozzle 61 into the delivery passage comprising nozzle bore 62, bore 63, delivery chamber 34, and delivery tube 80, the manual knob 67 is rotated to advance threaded sleeve or annulus 71 on the threaded portion 70 of control shaft 66. This advance of the abutment sleeve or annulus 71 tends to compress biasing spring 73, causing a biasing force to be exerted on diaphragm 29 and the valve nozzle 61 carried thereby. This imposition of spring biasing force unbalances the system and causes the valve nozzle 61 to move away from the valve seating end surface 74 of control shaft 66. When the valve is thus opened, compressed supply air will flow from pressure balancing chamber 45, 46 through bores 62 and 63 into delivery chamber 34, and this flow will continue until pressure in the latter is of sufficient magnitude as to create an opposing force on the back face of diaphragm 29 to counterbalance the biasing force of biasing spring 73. Upon such attainment of counter-balance of forces, the nozzle 61 will be forced to its seat 74 and flow of air into delivery chamber 34 will cease.

If delivery chamber 34 is connected by delivery tube 80 to a pneumatic circuit requiring or demanding a continuous supply of air (which, however, may vary in rate of flow due to variations in demand such as periodically and frequently occurs in operation of pressure gauge apparatus of the type disclosed in the above identified joint application), the movable valve nozzle 61 will be separated from its relatively fixed seat 74, reaching a balance position at a certain distance from that seat which will permit sufficient flow of air through the nozzle to maintain pressure in delivery chamber 34 of such magnitude as counterbalances the biasing force of spring 73. Any desired change of the pressure in delivery chamber 34, of course, may be attained by adjustment of the spring abutment sleeve 71 with manipulation of control knob 67.

Delivered compressed air flows from delivery chamber 34 through the Venturi constriction 82 in delivery tube 80. If the rate of flow is high, the pressure in the Venturi constriction 82 will be low and the force exerted on venting valve ball 88 will be relatively small. The biasing spring 89 of the venting valve is so designed or rated as to keep the valve ball 88 seated against its seat 87 when the pressure in the Venturi constriction 82 is at its lowest potential with high rate of flow through the delivery passage. If, however, the flow rate through the delivery passage or delivery tube 80 is materially decreased by diminishing demand of the device to which the regulator is connected, the pressure at the Venturi constriction 82 will be increased sufficiently to overcome the biasing force of venting valve spring 89. As a result, excess air will flow past venting valve ball 88 through venting valve chamber 86, bore 90, chamber 32 and holes 33, 33 to atmosphere. By bleeding off the excess air as the flow rate from the regulator is reduced, efficient operation is obtained with a minimum of motion of the valve nozzle 61 and spring 73 which biases it. As a result, an unusually efficient balance of forces is maintained.

If desired, the embodiment of the regulator shown in the drawings may be equipped with a pressure indicating gauge by suitable connection to delivery chamber 34. As shown in Fig. 6, the circumferential wall of casing section 27 may be provided with an internally threaded tapered hole indicated in dot-dash lines at 91, into which the connecting tube of such a gauge may be threadedly mounted.

It will be seen from the above that the pressure of air supply is used in the regulator of the present invention as a means of balancing forces, and many advantages assuring accuracy of the unit are characteristic of its operation. In the first place, the employment of an auxiliary spring to close the valve nozzle against the force of supply pressure on the nozzle seat, which is usual in regulators of conventional design, is eliminated. In the regulator of the present invention that force on the nozzle valve is balanced out by a force of the same pressure being applied in opposition thereto. This balancing of pressures eliminates a variable factor that is introduced by the employment of an auxiliary spring.

Further, since the diaphragm means or assembly is loaded by supply pressure in opposite directions, action-lag thereof is kept at a minimum. The force exerted by the valve biasing spring constitutes only a portion of the total force applied to the diaphragm assembly. Consequently, as change of spring and nozzle positions is accomplished by manipulation of the control knob or automatically takes place due to variations in the pressure in delivery means to maintain a balance of forces, there exists only a very small change in total balancing forces so that there will be no material tendency for the regulator to drift from its original seating.

A third advantage is attained by virtue of the fact that there is only one variable spring rate in the balancing equation. As a result, only a very slight movement of the valve nozzle is necessary to compensate for change in supply pressure and/or change in rate of flow from the delivery chamber, and such slight nozzle movement will change only the loading pressure of the valve biasing spring. Opening of the valve at the nozzle will cause the spring to expand slightly, thereby reducing the biasing force that it exerts. However, the mean effective area of the supply chamber diaphragm 26 will also be reduced slightly, and thus will offset the change in spring biasing force since the two opposed forces are on opposite sides of the condition of balance.

An additional advantage resides in the fact that effect of supply pressure against the portion of the nozzle or its seating face is eliminated from the regulator of the present invention since the area of that nozzle face is part of the effective area of balancing diaphragm 29.

The movements of the valve and biasing spring of apparatus of the present invention are always of minimum magnitude since the Venturi and bleed mechanism provide means for venting the excess of supplied fluid or air to drain or atmosphere as the flow rate of demand is reduced.

Advantages of the regulator of the present invention over a standard type of regulator and the simplification of operating characteristics thereof may readily be seen from the following equations:

*Force balance equation of standard type of fluid pressure regulator*

(a) $\quad P_{sp_1} = (P_r \times A_d) + (P_s \times A_n) + P_{sp_2}$ $P_{sp_1}$ = pressure exerted by main control spring
$P_{sp_2}$ = pressure exerted by auxiliary spring
$P_r$ = regulated or controlled pressure
$P_s$ = supply pressure
$A_d$ = area of diaphragm
$A_n$ = area of nozzle seat In some designs, the effective pressure $(P_s \times A_n)$ may be exerted in the same direction as the biasing force of the control spring. In that case, the equation is (b) $\quad P_{sp_1} + (P_s \times A_n) = (P_r \times A_d) + P_{sp_2}$

*Force balance equation of an embodiment of the present fluid pressure regulator*

(c) $\quad (P_s \times A_d) + P_{sp} = (P_s \times A_d) + (P_r \times A_d)$ $P_s$ = supply pressure
$P_r$ = regulated or controlled pressure
$P_{sp}$ = pressure exerted by spring
$A_d$ = area of balancing diaphragms It will thus be seen that the objects set forth above among those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fluid pressure regulator comprising, in combination, a supply pressure chamber, a diaphragm defining one wall of said supply chamber, a pressure balancing chamber, another diaphragm defining one wall of said balancing chamber, a delivery chamber interposed between said diaphragms with one wall thereof defined by said balancing chamber diaphragm on the side opposite that which defines one wall of said balancing chamber, means isolating said supply chamber diaphragm from fluid in said delivery chamber, rigid means interposed between said diaphragms to permit transmission of pushing force from one to the other, means providing a supply fluid inlet passage to said supply chamber and a communicating passage between that chamber and said balancing chamber, means providing a delivery passage leading from said balancing chamber to said delivery chamber and from the latter, valve means upstream of said delivery chamber for controlling flow through the delivery passage including a movable valve element connected to said balancing chamber diaphragm and a relatively fixed cooperating valve element, regulating spring means for biasing said movable valve element toward open position, and means to adjust the biasing force of said spring means.

2. A fluid pressure regulator comprising, in combination, a supply pressure chamber, a diaphragm defining one wall of said supply chamber, a pressure balancing chamber, another diaphragm defining one wall of said balancing chamber, a delivery chamber interposed between said diaphragms with one wall thereof defined by said balancing chamber diaphragm on the side opposite that which defines one wall of said balancing chamber, means isolating said supply chamber diaphragm from fluid in said delivery chamber, rigid means interposed between said diaphragms to permit transmission of pushing force from one to the other, means providing a supply fluid inlet passage to said supply chamber and a communicating passage between that chamber and said balancing chamber, means providing a delivery passage leading from said balancing chamber to said delivery chamber and from the latter, valve means in said balancing chamber for controlling flow through the delivery passage including a movable valve element mounted on said balancing chamber diaphragm and a relatively fixed cooperating valve element, regulating spring means for biasing said movable valve element toward open position, and means to adjust the biasing force of said spring means.

3. A fluid pressure regulator comprising, in combination, a supply pressure chamber, a diaphragm defining one wall of said supply chamber, a pressure balancing chamber, another diaphragm defining one wall of said balancing chamber, a delivery chamber interposed between said diaphragms with one wall thereof defined by said balancing chamber diaphragm on the side opposite that which defines one wall of said balancing chamber, means isolating said supply chamber diaphragm from fluid in said delivery chamber, rigid means interposed between said diaphragms to permit transmission of pushing force from one to the other, means providing a supply fluid inlet passage to said supply chamber and a communicating passage between that chamber and said balancing chamber, means providing a delivery passage leading from said balancing chamber to said delivery chamber and from the latter, valve means in said balancing chamber for controlling flow through the delivery passage including a movable valve element mounted on said balancing chamber diaphragm and a relatively fixed cooperating valve element, regulating spring means for biasing said movable valve element toward open position, means to adjust the biasing force of said spring means, means providing a Venturi constriction in the delivery passage downstream of said delivery chamber, means providing a venting passage connected to the delivery passage at the Venturi constriction, a spring-biased venting valve in the venting passage openable downstream with flow of fluid away from the Venturi constriction, and valve-biasing spring means for said venting valve having a predetermined biasing force rating.

4. A fluid pressure regulator comprising, in combination, a supply pressure chamber, a diaphragm defining one wall of said supply chamber, a pressure balancing chamber, another diaphragm defining one wall of said balancing chamber, a delivery chamber interposed between said diaphragms with one wall thereof defined by said balancing chamber diaphragm on the side opposite that which defines one wall of said balancing chamber, sealing partition means constituting the opposite wall of said delivery chamber and isolating pressure therein with respect to said supply chamber diaphragm, a rigid stem fixed on said supply chamber diaphragm and projecting into said delivery chamber, rigid stem means carried by and extending through said balancing chamber diaphragm with one end thereof abutting the end of said stem in said delivery chamber and the other end thereof extending into said balancing chamber, said stem means being bored to provide a flow passage between said balancing and delivery chambers with the end in said balancing chamber constituting a movable valve nozzle, means providing a supply fluid inlet passage to said supply chamber and a communicating passage between that chamber and said balancing chamber, means providing a delivery passage leading from said delivery chamber for connection to fluid demanding means, a relatively fixed valve seat means mounted in said balancing chamber to be abutted by said valve nozzle for closing off the latter, regulating spring means for biasing said valve nozzle and balancing chamber diaphragm away from said valve seat means, manual means to adjust the biasing force of said spring means, means providing a Venturi constriction in the delivery passage, means providing a venting passage connected to the delivery passage at the Venturi constriction, a spring-biased venting valve in the venting passage openable downstream with flow of fluid away from the Venturi constriction, and valve-biasing spring means for said venting valve having a predetermined biasing force rating.

5. A fluid pressure regulator comprising, in combination, a chambered casing structure having therein a supply pressure chamber and a delivery chamber, a diaphragm defining one wall of said supply pressure chamber, another diaphragm having one face defining one wall of said delivery chamber with its opposite face subjected to pressure of fluid in said supply chamber, means connecting said diaphragms together so that supply fluid pressure force on said second diaphragm will act in opposition to supply fluid pressure force on said first diaphragm, means providing a supply fluid inlet passage to said supply chamber, means providing a delivery passage from said delivery chamber, means providing a communicating passage between opposite sides of said second diaphragm to lead to said delivery passage, valve means for controlling flow through the communicating passage including a movable valve element connected to said second diaphragm and a relatively fixed cooperating valve element, regulating spring means for biasing said movable valve element toward open position against fluid pressure force in said delivery chamber, means providing a Venturi constriction in the delivery passage, means providing a venting passage connecting the Venturi constriction to atmosphere, a spring-biased venting valve in the venting passage openable downstream with flow of fluid toward atmosphere, and valve-biasing spring means for said venting valve having a biasing force rating sufficient to keep that valve closed with flow rate through the delivery passage above a predetermined minimum while permitting bleed off of excess delivered fluid with diminished demand.

FRANKLIN MEYER, JR.

REFERENCES CITED

The following references are of record in the file of this patent:

UNITED STATES PATENTS

| Number | Name | Date |
|---|---|---|
| 796,959 | Croslen | Aug. 8, 1905 |
| 1,380,787 | Elimauer | June 7, 1921 |
| 1,525,426 | Mueller | Feb. 3, 1925 |
| 2,156,823 | Stettner | May 2, 1939 |
| 2,433,414 | Annen | Dec. 30, 1947 |